United States Patent [19]

James, Jr.

[11] 3,941,971

[45] Mar. 2, 1976

[54] RESISTANCE BRAZING OF SOLID COPPER PARTS TO STRANDED COPPER PARTS WITH PHOS-SILVER

[75] Inventor: Frank W. James, Jr., Doctors Inlet, Fla.

[73] Assignee: Westinghouse Electric Corporation, Pittsburgh, Pa.

[22] Filed: Nov. 27, 1974

[21] Appl. No.: 527,928

[52] U.S. Cl. ............... 219/85; 29/199; 219/119
[51] Int. Cl.² ......................................... B23K 1/04
[58] Field of Search ........ 29/199; 219/118, 119, 91, 219/85; 148/32; 75/176, 208 R

[56] References Cited
UNITED STATES PATENTS

| | | | |
|---|---|---|---|
| 2,795,520 | 6/1957 | Ballentine | 148/32 |
| 3,382,066 | 5/1968 | Kenney et al. | 75/208 |
| 3,438,753 | 4/1969 | Kenney et al. | 75/208 X |
| 3,602,682 | 8/1971 | Hoeffleur | 219/118 X |

OTHER PUBLICATIONS

Metals Handbook, 8th Ed., Vol. 6 (1971), pp. 408–410, 475–484.
J. Phys. E. Vol. 5, No. 1, Jan. 1972 p. 10, "Spot Welding of Thin Copper Sheets," Dance et al.
"Engineering Alloys," Woldman et al., 1936, pp. 143, 374.

*Primary Examiner*—L. Dewayne Rutledge
*Assistant Examiner*—Arthur J. Steiner
*Attorney, Agent, or Firm*—R. T. Randig

[57] ABSTRACT

The present invention relates to a method for joining a solid copper member to a stranded copper member employing phosphorus-silver-copper alloys as the joining material and in which resistance heating is utilized in forming the joint. More specifically, the invention employs a copper tungsten alloy for the tip portion of an electrode which is in contact with the stranded copper member to enable good joints to be made.

2 Claims, 1 Drawing Figure

RESISTANCE BRAZING OF SOLID COPPER PARTS TO STRANDED COPPER PARTS WITH PHOS-SILVER

BACKGROUND OF THE INVENTION

1. Field of the Invention

The present invention relates to the method of forming joints between copper members, one of which is stranded, which are utilized in transformer parts. More particularly, the invention is directed to the method of forming an assembly containing a solid terminal which is joined to a flexible or stranded copper wire, the joint being made by resistance brazing employing a joining compound of the copper-silver-phosphorus type.

2. Description of the Prior Art

High volume brazing of stranded copper wire to a solid copper part employing phosphorus-silver-copper (hereinafter called "phos-silver") as the joining material can be a real problem when the same is performed on a resistance welder. One of the major difficulties encountered is the fact that the copper parts start sticking to the electrode tips and eventually destroy the usefullness of the tips of the electrodes of the resistance welder.

In high production runs of producing such assembled parts, the individual components or subassemblies are usually loaded on an indexable table in which a solid copper member of the desired configuration is placed in position on which a thin strip or sheet of the joining composition is placed on the solid copper member. Thereafter the stranded copper wire or subassembly is placed in position over the joining material. As thus assembled the electrodes of a resistance welder are placed on opposite sides of the assembly, one of the electrodes being in contact with the solid copper member and the other in contact with the stranded copper wire component. Pressure is applied and the welder is thereafter energized at which time it passes approximately 10,000 amperes through the electrodes and the parts assembled for a duration of about 1 second. During this time, the electrode tips as well as the parts heat up until a sufficient temperature is achieved at which the phos-silver joining composition melts.

Heretofore the tips of the resistance welding electrodes were formed of molybdenum or molybdenum base alloys because at the temperatures employed and with the phos-silver joining material having low wetability for the molybdenum, it was believed that no problem would be incurred of the finished parts sticking to the electrode. However, with the proximity of the stranded wires and the pressures employed acting on the molten material, it was found that the material "wicked" through the wire and came into contact with the electrode contacting the stranded wire. This was apparently caused by the fact that the stranded wire heated up to a higher temperature and more quickly than the solid copper member and as a result, the stranded copper part appeared to act more as a resistor than a conductor. Consequently, after a short period of use the supposed low wetability of the molybdenum tip of the resistance welding electrode was no longer effective and the stranded copper portion of the assembly began to stick to the electrode tip, with the result that the entire operation had to be interrupted and the resistance welding tip replaced with a consequent cleaning of the adjacent parts. This malfunctioning severely limited the number of parts that could be produced within a given time period. In accordance with this invention, it was discovered that a solution to this problem required a heat balance be achieved by minimizing the thermal gradient between the electrode in contact with the solid copper member and the electrode in contact with the stranded copper member, so that both the solid and stranded copper members were at nearly the same temperature at the time the joining material melted.

SUMMARY OF THE INVENTION

The present invention is directed to a method for joining solid copper members to stranded copper members by a resistance welding technique and specifically in which the tip of the electrode which is in contact with the stranded copper member comprises an alloy consisting essentially of tungsten and copper in which the tungsten and copper ratio is about 3:1 on a weight percentage basis. The solid copper is in contact with an electrode of molybdenum or silver-molybdenum alloy. In particular, it has been found that by employing electrode tips of thermal conductivities correlated to the heat developed in the copper strand and solid copper, thereby maintaining a proper heat balance between the materials to be joined and the tips of the resistance welding electrodes reliable joints can be fabricated where the electrode in contact with the stranded copper is provided with a composition so that the theoretical thermal conductivity of the electrode tip material in contact with the stranded copper ranges between about 0.55 and about 0.68 gr. Cal/cm$^2$/°K/cm/Sec. Molybdenum has a thermal conductivity of about 0.33 gr. Cal/cm$^2$/°K/cm/Sec, while 20% silver - 80% molybdenum alloy has a thermal conductivity of about 0.45 gr. Cal/cm$^2$/°K/cm/Sec.

DESCRIPTION OF THE PREFERRED EMBODIMENT

The present invention is directed to a method of metallurgically joining a solid copper member to a stranded copper member employing a phos-silver joining material and in which a resistance welder is used. The joined members form a stationary lead which finds use in circuit breakers, transformers and the like.

Figure 1:
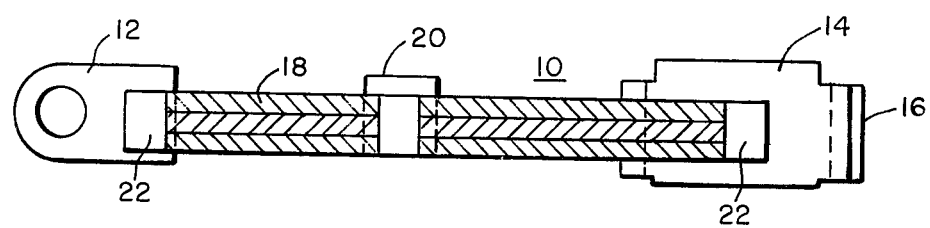
FIG. 1 is a top view of a Stationary Lead Assembly and, FIG. 2 is a side view of the same assembly.
Figure 2:
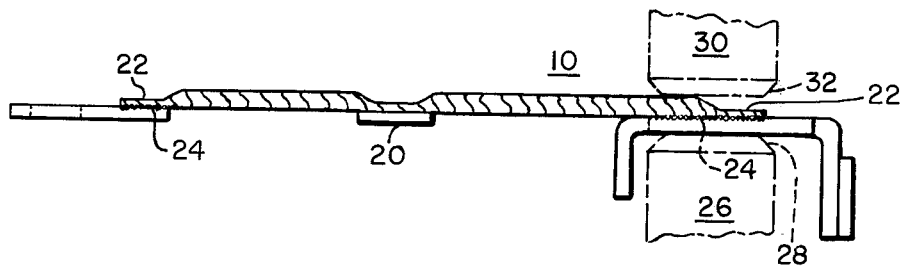

Referring now to FIGS. 1 and 2 of the drawings there is shown generally a stationary lead assembly at 10 which comprises an external connection terminal 12 at one end thereof and a contact terminal 14, the later of which is usually disposed interiorly of, for example, a circuit breaker. Typically the terminal 14 has fastened thereto a contact surface 16 which mates with another contact surface, not shown, in the circuit breaker assembly, the contact 16 being the fixed contact. Spanning the gap between the interior terminal 14 and the external terminal 12 of the stationary lead assembly 10 is one or more lengths of stranded copper wire 18 which function is to provide flexibility between the internal terminal and the external terminal 12. Typically one or more lengths of the stranded wire 18 span the distance between the terminals 12 and 14.

In actual production the stranded copper 18 is a subassembly wherein an anchor 20 is connected to the stranded copper 18 to isolate physical stresses on terminal 12 from terminal 14 when the part is assembled in a circuit breaker and to maintain the plurality of strands of copper wire in close proximity to one another. This is usually accomplished by press welding or brazing the strands to the intermediate anchor 20. In similar manner the terminating portion of the strands 18 are usually pressed so as to form a flat surface 22 adjacent the terminal 12 and the terminal 14.

In the actual manufacture of the stationary lead assembly 10, the terminal 12 and the terminal 14 are positioned on an indexable table and a joining material 24 is placed adjacent that portion of the terminal which will overlap with the subassembly which will be placed to span the distance between the terminal 12 and the terminal 14. Good success has been had with a phos-silver alloy which has been performed into a thin sheet, strip or ribbon from which a convenient length may be severed and placed on each of the solid copper terminal members 12 and 14. A suitable composition for joining the stranded copper wire member to the solid copper terminal member consists of a phosphorus-silver copper alloy such as is described in U.S. Pat. No. 2,795,520. Thereafter the subassembly of the stranded copper wire 18 is placed in position to span the distance between the two terminals 12 and 14 and in contact with the joining material 24 which has been placed on the solid copper terminal members.

As thus assembled, the terminal 12 and one end of the stranded copper 18 are placed between the electrodes of a resistance welder. As illustrated in the drawing, the electrode 26 which is in contact with the solid terminal 12 on the side opposite from the joining compound is preferably formed having a tip 28 of molybdenum since molybdenum possesses low wetability with respect to the copper and is quite effective for rapidly heating the terminal 12 in the portion adjacent or beneath the joining alloy to a temperature sufficiently high to cause the joining alloy to melt. The opposite electrode 30 of the resistance welder is brought into contact with the stranded copper subassembly 18. In order to insure a good joint and to effectuate uniformity within the joint, pressure between the opposed resistance heating electrodes is applied, such pressure varying between about 100 and about 800 pounds per square inch. The pressure between the welding electrodes not only insures rigidity of the assembled components during the heating operation but in addition provides for good contact and the assurance of a sound joint therebetween.

The electrode 30 which is in contact with the stranded flexible copper wire member 18 is of critical importance in the joining operation. In this respect the electrode must not heat the stranded copper wire to a sufficiently high temperature that wicking will occur, that is, that through the capillary action, combined with the force applied between the welding electrodes and the thermal gradient between the electrodes, capillary action must be minimized so that the molten joining material when the electrodes are energized does not flow up and into contact with the electrode thereby ultimately adhering thereto and causing sticking of the joined parts when the joining alloy has cooled and solidified.

Heretofore, the tip 32 that had been employed in contact with the stranded copper wire also comprised molybdenum since it was believed that because of the low wetability, little wicking would occur with the result that a sound clean joint would be formed. In contrast to what had been expected, the molybdenum tip portion of the electrode which was in contact with the stranded copper wire together with the copper wire appeared to act as an additional resistor rather than a conductor and as result localized heating appeared to have occurred causing the joining alloy when molten to wick through the individual strands of the copper wire and after a short period cause the assembled components to stick to or adhere to the tip of the welding electrode in contact with the stranded copper wire.

In order to alleviate this condition, it was found that the contact area or tip 32 of the electrode which was touching the stranded copper wire could provide the proper heat balance when the same was formed of an alloy consisting essentially of tungsten and copper in which the tungsten to copper ratio was about 3:1 on a weight percentage basis. Moreover, while this general ratio was also applicable it was further found that deviations from this idealized ratio of tungsten to copper were permissible so long as the theoretical thermal conductivity of the material which formed the contact touching the stranded copper wire during the joining operation was controlled such that the tungsten and copper were present in proportions which would provide a theoretical thermal conductivity which was exhibited by the contact material ranging between about 0.55 and 0.68 gr. Cal/cm$^2$/°K/cm/Sec. Thus an electrode tip 32 was formed containing about 75% tungsten and about 25% copper, and this tip material was utilized in joining the solid copper terminals to the stranded copper wires so that the phos-silver joining alloy which was melted during the operation not only did not wick through the individual copper wires of the strand but rather formed a fillet around the edge of the wire with the result that a sound reliable joint could be produced without any sticking occurring.

In the actual conditions which the stationary lead assembly was manufactured, the tip 32 of the electrode 30 which was in contact with the stranded copper wire 18 was formed employing powder metalurgical techniques of sintering tungsten powder which was thereafter infiltrated with copper such that a tungsten was present in the amount of 75% by weight of the contact material and the copper was present in an amount of approximately 25% of the contact material. This tip composition was shaped to the desired configuration of the resistance welding electrode and installed thereon so that when placed in contact forming the stationary lead assembly, the tungsten-copper contact material was adjacent to the stranded copper portion. A force of 200 pounds was then applied between the welding electrodes, the solid copper member, the stranded copper member and the joining alloy which was interposed between the solid copper member and the stranded copper member. Thereafter the welder was energized and passed approximately 10,000 amperes through the electrode and the parts for a time period of about 1 second. This was sufficient to cause the phos-silver joining composition to melt and form a clean fillet around the edge of the stranded copper wire and join the stranded copper wire to the solid copper terminal portion. The process was repeated to form each end of the stationary lead assembly and in excess of 2500 parts were produced without any evidence of sticking.

It is believed that by regulating the composition of the welding electrode contact tip area, in a manner as heretofore described, has resulted in a better heat balance and the minimizing of thermal gradients between the welding electrodes of the resistance welder. Sufficient heat is supplied to the joint area so that the phos-silver melts and forms a strong reliable bond in the formation of stationary lead assembly.

What is claimed is:

1. In the method of brazing solid copper to stranded copper by means of a joining compound containing copper, silver and phosphorus which method includes clamping under predetermined force the members to be joined in predetermined relation with the joining metal disposed therebetween and in which the joint to be effected is heated by resistance heating including the utilization of a molybdenum tip on the electrode adjacent the solid copper, the improvement comprising forming at least the tip of the opposite electrode which is in contact with the stranded copper from a composite consisting essentially of tungsten and copper in which the tungsten to copper ratio is about 3:1 on a weight percent basis.

2. The method of claim 1 in which the tungsten to copper ratio is varied over a range to provide a theoretical thermal conductivity of between about 0.55 and about 0.68 gr. Cal/cm$^2$/°K/cm/Sec.

* * * * *